United States Patent Office 3,422,706
Patented Jan. 21, 1969

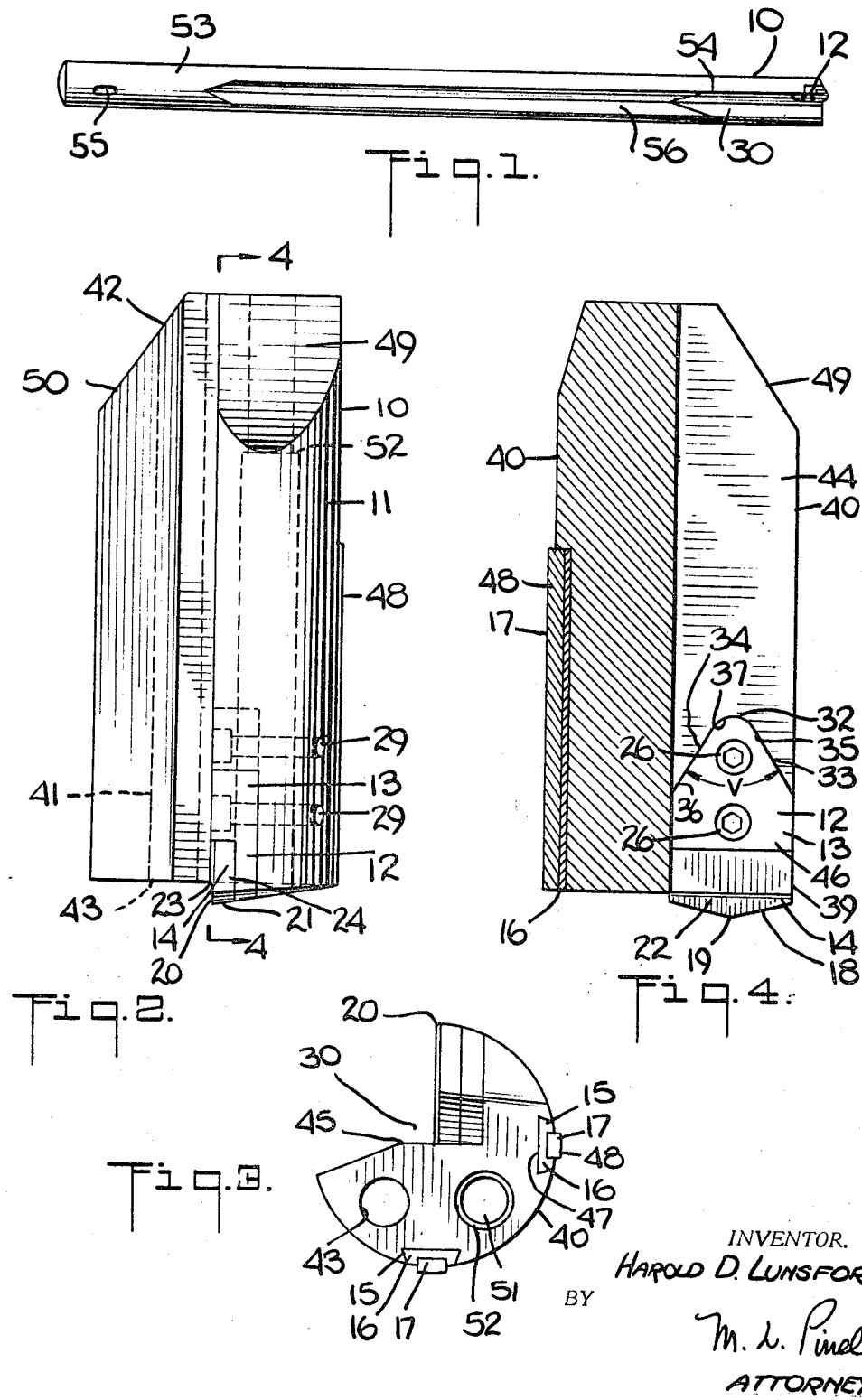

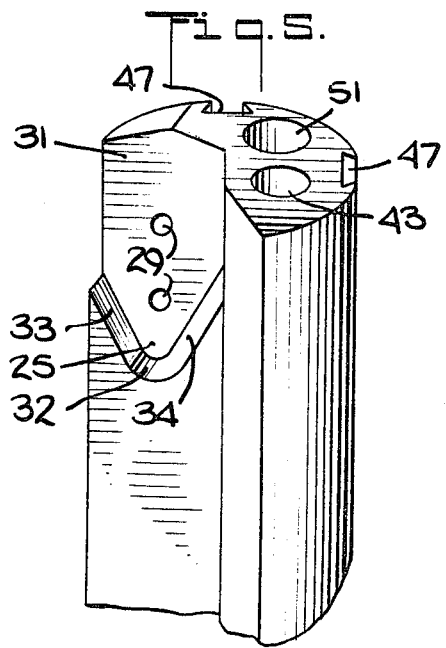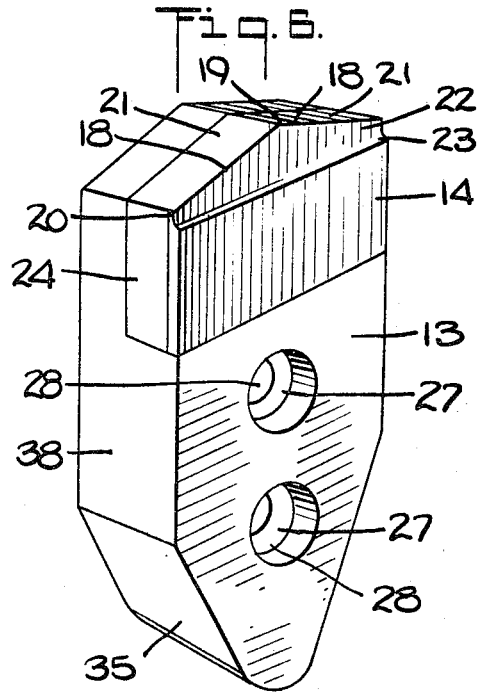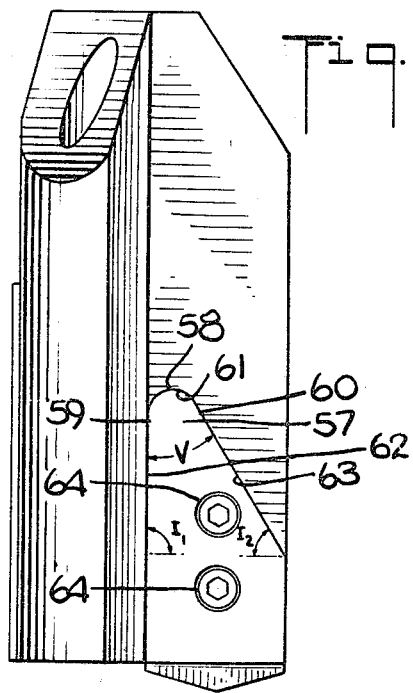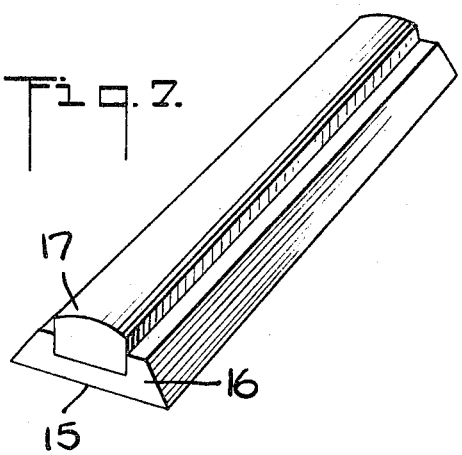

3,422,706
GUN DRILL
Harold D. Lunsford, Huntington, W. Va., assignor to The International Nickel Company, Inc., New York, N.Y., a corporation of Delaware
Filed Aug. 6, 1965, Ser. No. 477,894
U.S. Cl. 77—68           17 Claims
Int. Cl. B23b 51/06

ABSTRACT OF THE DISCLOSURE

Gun drill has special attachment of cutting element that enables replacing the cutting element without damaging the drill head and also provides high rigidity for holding the cutting element immovably in the head.

---

The present invention relates to drills for making deep holes in metal and more particularly to deep hole drills known as gun drills.

Heretofore, the art has devised many different kinds of tools for making holes in metal workpieces and the satisfactoriness of a particular kind of tool in a specific instance depends to a major extent on the quality requirements covering the finished workpiece. Where high degrees of dimensional accuracy and smoothness of surface finish are not required, tools such as trepanning heads, spade drills, boring heads and the like have been employed with considerable success. However, it has been found that highly superior results in the way of surface smoothness and precise dimensional accuracy, including diameter, straightness and concentricity, are obtained by drilling deep holes with gun drills, as compared to results obtained by trepanning, spade drilling, boring, etc. While gun drills are particularly known as being useful for drilling barrels of guns and rifles, gun drills are also used for drilling deep holes of relatively small diameter in other metal articles and elongated metal bodies including cam shafts, hollow arbors, extrusion billets, marine propeller shafts, machine tool spindles, heavy walled tubular sections used in jet engines, nuclear engine parts, various automotive and aircraft parts, parts used in the manufacture of diesel engines and heavy construction equipment, etc. Known types of gun drills include a center-cut type, which has a cutting edge at the axis of the drill and is capable of drilling blind holes, and a target type, which has an axial passage and does not cut to the center of the hole.

When used for drilling deep holes a gun drill is rigidly and tightly attached to the forward end of a drive bar. Frequently, the drive bar is fully cylindrical for a short distance near the rearward end and is partially cylindrical along the major length of the bar, including the forward end thereof, with the partially cylindrical cross section having a cross-sectional circular sector of about 250 degrees. When in use, the cylindrical end is mounted in a holding device which serves either to rotate the bar or to prevent the bar from rotating, depending upon whether the workpiece is held stationary or is rotated.

Usually a gun drill comprises an elongated, partially cylindrical head with a large single flute, wear pads at side surfaces of the head for supporting and/or guiding the drill in the partially drilled hole, a cutting tip which is attached to the forward end of the head and is generally coextensive with the leading face of the flute and mounting means at the rearward end thereof for mounting the head upon the drive bar. Typically, the flute of a gun drill includes a large central angle of the head cross section and extends along an arc of at least about 90 degrees or as great as about 130 degrees of the cutting circle of the drill. The head is so oriented on the bar that the flute communicates with the open portion of the drive bar, thereby providing an exit for chips and coolant fluid through the flute and the open portion of the bar.

In gun drilling, the cutting tip is subjected to great forces tending to displace the tip in relation to the drill head and, accordingly, the cutting tip of a gun drill must be strongly and rigidly fixed in relation to the drill head so that there is no relative motion between the cutting tip and the drill head during drilling. Otherwise, if the cutting tip should come even slightly loose, any play or other relative movement between the tip and the head of the drill will have detrimental effects on the results of the drilling operation, such as by causing inaccuracies, chattering, and/or uneven surface finish. Development of play between the tip and the head can be even more detrimental than for the tip to be broken completely off the head since looseness of the cutting tip can result in spoiling the workpiece, or even many workpieces, before the fault in the tool is discovered.

Gun drills in the prior art have cutting tips which are fused to the heads by brazing, silver soldering or other fusion bonding methods. However, although fusion bonding provides rigid attachment of the tip, fusion bonded heads have serious disadvantages due to the permanent nature of a fused attachment of the tip to the head. It is not possible, at least on a practical commercial basis, to replace the tip or wear pads on a fusion bonded head because the heat required to melt the fusion bond causes distortion and annealing, and/or other detrimental heat treatment, of the head and renders it useless for its intended purpose. Gun drills are expensive, precisely made tools and the costs of replacing entire drills whenever the cutting tips are damaged or dulled adds substantially to costs of producing pieces with gun drilled holes, especially where the tools are employed in drilling tough, difficultly machinable alloys which cause rapid wear of cutting tools. Although it is sometimes possible to resharpen the tip of a fusion bonded head without removing the tip, only a few resharpenings are possible before the tip becomes ground down beyond further usefulness. Moreover, with the fusion bonded heads, excessively high investment in additional drills is required in order to have enough drills on hand to enable continued drilling while worn cutting tips are being resharpened and also because each drill with a fusion bonded head can only be used for drilling holes of one diameter. Among other disadvantages, gun drills in the prior art sometimes fail by becoming "pushed-in" or otherwise distorted at the portion supporting the cutting tip.

Wear pads on previously made gun drills are also fusion bonded to the heads and additional disadvantages arise from necessity of replacing drills when wear pads are worn or damaged. Inasmuch as the wear pads, in order to satisfactorily support and/or guide the drill, must extend far enough from the drill center to bear against the wall of the partially drilled hole, gun drill heads having wear pads fusion bonded thereto are rendered useless for their original purpose when the wear pads become overworn.

Disadvantages of fusion bonded gun drills in the prior art are particularly evident and severe when gun drilling tough, heat-resistant and/or work-hardenable alloys including nickel-base alloys, especially nickel-base alloys containing substantial amounts of chromium, e.g., 10% or more chromium, referred to herein as nickel-chromium alloys and sometimes also containing alloying additions of cobalt, iron, aluminum, titanium, molybdenum, columbium, etc. In gun drilling alloys such as nickel-chromium alloys and the like, very high pressures are developed. These pressures lead to rapid creation of wear lands on the cutting edge of the tool and to rapid and severe wear and/or damage of wear pads and, thus, overly frequent, costly and excessive reconditioning and replacement of fusion bonded drills has been particularly necessitated when gun drilling such alloys.

Although many attempts were made to overcome the foregoing difficulties and other difficulties and disadvantages, none, as far as I am aware, was entirely successful when carried into practice commercially on an industrial scale.

It has now been discovered that improved tool life, increased ranges of usefulness and other advantages, including overcoming the difficulties and disadvantages referred to hereinbefore, are obtained with a new gun drill having a replaceable cutting tip and replaceable wear pads.

It is an object of the present invention to provide a new gun drill having a drill head with a replaceable cutting tool insert.

Another object of the invention is to provide a new gun drill wherein the cutting tool and/or the wear pads are mechanically fixed to the head so as to be replaceable without heating or otherwise detrimentally affecting the head and wherein the cutting element and/or wear pads are supported in a special manner.

The invention further contemplates providing a new gun drill head which is specially adapted for holding a replaceable tool insert with a cutting element in rigidly fixed, mechanically fastened, replaceable association with the head, thereby enabling the head to have a satisfactory usable service life many times greater than the usable life of the cutting element and also enabling the head to be used for drilling holes within a range of sizes by replacing the initially provided separable tool insert with tool inserts of different sizes.

Moreover, it is also an object of the invention to provide a new drill for accurately drilling deep holes of relatively small diameter with improved efficiency and long life of the drill head to produce, without reaming, machined holes with high dimensional precision and a high quality of surface finish sufficient to satisfy, without reaming, requirements of commercial specifications for drilled holes in metals, even where the metals to be drilled are of compositions that pose particularly difficult problems of machinability such as are encountered in drilling work-hardenable nickel-chromium alloys.

Other objects and advantages will become apparent from the following description taken in conjunction with the accompanying drawing, in which:

FIGURE 1 is a perspective view of an assembled gun drill in accordance with the invention;

FIGURE 2 is an elevation side view of a gun drill in accordance with the invention;

FIGURE 3 is an elevation end view of the forward, working end of the gun drill illustrated in FIGURE 2;

FIGURE 4 is a sectional view of the drill illustrated in FIGURES 2 and 3 taken at 90° to the view of FIGURE 2 and at line 4—4 of FIGURE 2;

FIGURE 5 is a perspective view illustrating the forward portion of the gun drill head, without inserts, illustrated in FIGURES 2, 3 and 4;

FIGURE 6 is a perspective view of a cutting tool insert in accordance with the invention;

FIGURE 7 is a perspective view of a wear pad insert in accordance with the invention; and FIGURE 8 is an elevation side view, taken in the same direction as the view of FIGURE 4, of a gun drill within the invention.

Generally speaking, the present invention contemplates a new gun drill having an elongated gun drill head and a replaceable cutting tool insert which is mechanically held in rigidly fixed, mechanically fastened, replaceable association with the head of the drill. The head for the new drill has a cutting tool base seat in the forward portion of the head, a large flute which extends longitudinally in the head for the full length thereof and a rearward portion which is adapted to be rigidly attached to a drive bar. The cutting tool insert comprises a cutter tip bonded to a cutting tool base. The cutting tool insert is mechanically held in the drill head with coacting mechanical holding means including both the cutting tool base seat and a replaceable mechanical fastener which is attached to the head. The seat has base and side walls which are adapted to coact with the mechanical fastener to prevent axial and radial movement of the tool insert with respect to the drill axis. The cutter tip can be, and advantageously is, fusion bonded to the cutting tool base but must not be fusion bonded to the drill head. A particularly advantageous embodiment of the invention is a new gun drill having, in addition to a replaceable cutting tool insert, a replaceable wear pad insert which is mechanically held in the drill head in replaceable association with the head.

In carrying the invention into practice, high rigidity of the cutting tool in the new drill is obtained with advantageous embodiments thereof wherein the seat for the cutting tool base has a forward facing base wall for supporting the cutting tool insert against machining forces tending to drive the cutting tool rearward in relation to the head and also having a pair of mutually opposed side walls which are each inclined longitudinally at least 45° and not more than 90° internally and rearwardly to the drill radius. Angles referred to herein as angles of inclination of a side wall to the drill radius are angles which are in the plane of the leading face of the flute and which are included within the seat between the side wall and a radius of the drill intersecting the side wall (or a projection of a radius of the drill on the leading face of the flute if said face is not in a plane coextensive with the drill axis) and are rearward of said intersecting radius. A V-groove seat with substantially radially opposed side walls longitudinally inclined toward each other so as to define an included angle (the V-angle) of about 25° to about 90° with each side wall inclined at least 45° to the drill radius, is advantageous for obtaining high rigidity in mechanically holding the cutting tool in fixed replaceable association with the drill head. More advantageously, the V-angle is 25° to 60° and the side walls are inclined at least 60°. V-angles of less than 25° or more than 90° and side wall inclinations of less than 45° to a drill radius are not wholly satisfactory for obtaining high rigidity of the cutting tool under heavy loads in drills in accordance with the invention. Thus, having the V-angle greater than 90° or having the side walls inclined less than 45° results in inadequate support in the seat and detrimentally reduced rigidity of the cutting tool including poor resistance to rotational movement of the cutting tool by drilling forces tending to develop a couple rotational moment. On the other hand, with V-angles less than 25° the amount of metal between the bolt hole and the side wall is reduced so much that there is inadequate strength for good rigid holding ability under high loads. Also, for attaining good rigidity in holding the cutting tool, it is advantageous that the drill have a plurality (at least two) of mechanical fasteners attaching the cutting tool base to the head. Mechanical fasteners referred to herein for holding the tool base to the head include bolts, pins, clamps and combinations thereof, along with other replaceable mechanically holding fasteners that can be released without damaging the drill head.

Referring now to the drawing, FIG. 1 illustrates a particular embodiment of a gun drill assembly within the contemplation of the present invention wherein drill 10, having replaceable cutting tool insert 12 at one end thereof, is rigidly fixed at its rearward end to drive bar 53. As illustrated in greater detail in FIGS. 2 through 7, drill 10, which is a center cut drill having capability for drilling blind holes and through holes, comprises elongated, partially cylindrical drill head 11 and replaceable cutting tool insert 12 which is seated in the forward portion of the head and includes cutting tool base 13 and preformed cutter tip 14. Drill 10 also comprises replaceable, longitudinally extending wear inserts 15, which include pad bases 16 and wear pads 17. Cutter tip 14 extends forwardly from the base and has preformed working surfaces and edges including forward facing cutting edges 18, point 19, side cutting edge 20, forward facing relieved surfaces 21, cutter tip face 22 and chip breaker step 23 and is ground with side clearance at 24. The cutter extends radially of the drill axis from the outer side surface of the head to slightly beyond, or across, the center of the head in order to provide for especially good cutting at the center of the hole to be drilled. Cutting edges 18 each also extend radially of the drill axis. Cutter tip 14 is fusion bonded by silver soldering to base 13. Base 13 is replaceably engaged in groove seat 25 and is also mechanically attached with bolts 26 which are seated on steps 27 in stepped holes 28 in base 13 and fitted in threaded holes 29 in head 11. Cutting tool base seat 25 is a V-groove which extends back into the head from the leading face of flute 30 and has head wall 31, base wall 32 and a pair of internal, radially opposed, substantially flat side walls 33 (outer) and 34 (inner) forming an opening toward the forward end of the head and mutually divergent from each other by included angle V. FIG. 4 illustrates a V-groove seat having a V-angle of about 60° and having side walls each inclined at about 60° to the drill radius. Seating surfaces 35, 36 and 37 of the tool insert are adapted to mate with walls 33, 34 and 32, respectively. While the outer side surfaces 38 and 39 of base 13 and tip 14, respectively, are coextensive with partially cylindrical side surface 40 of the head, the present illustrative cutting tool insert can be replaced with a larger insert having a cutting tool base and cutter tip which extend radially beyond side surface 40 in order to enable cutting a hole of greater diameter. The illustrative drill head is provided with coolant passage 41 extending longitudinally through the head, including the central portion which is sometimes referred to as the shank, and having entrance port 42 at the rearward end of the head and exit port 43 at the forward end of the head. The single large chip flute 30 which extends the length of the head has leading face 44 and trailing face 45. Flute leading face 44 is generally coextensive with tool insert leading face 46 and the cutter tip is directly adjacent the flute. Wear pads 17 are brazed to pad bases 16 and the pad bases are replaceably engaged in wear pad seats which are illustrated as longitudinal dovetail grooves 47 in the outer side of the drill head. Thus, wear pads 17 are replaceably mechanically attached to the drill head. In some other embodiments of the invention, e.g., in drills of relatively small diameters such as 1.75 inch diameter or smaller, wear pads without pad bases are replaceably mechanically attached in groove seats with bolts fitting in threaded holes in the head, such as longitudinal threaded holes entering at the forward end of the head. Pads 17, having protruding wear surfaces 48, extend radially beyond side surface of the drill head and are thus adapted to guide and support the drill head and the cutting tool in the hole being drilled. Wear pad surfaces 48 are ground to provide that these surfaces and the side cutting edge of the cutter tip lie on a hypothetical circle having the nominal diameter of the drill. The rearward portion of the head, which is adapted to fit a drive bar, is of a wedge-shaped configuration having rearward tapered surfaces 49 and 50 provided at the rearward end portion of the head to facilitate fitting the head to a drive bar for holding, rotating and/or feeding the drill. Also, the head has stepped hole 51 extending lengthwise through the head. When the head is attached to a drive bar, a bolt (not shown) is seated on step 52 and fits in a threaded hole in the drive bar so that the combined wedge-like holding effect of surfaces 49 and 50 and the bolt in hole 51 hold the head rigidly and replaceably fixed to the drive bar. Referring back to FIGS. 1 and 2, it is noted that drive bar 53 is connected to drill 10 at junction 54 and that coolant port 55 in drive bar 53 communicates through entrance port 42 with coolant passage 41 to provide for transmitting liquid coolant from a pumping means through the drive bar and head and out of exit port 43 to the working portions of the cutter. The large straight flute 30, which desirably is generally coextensive with the drive bar flute 56, communicates with the forward and rearward ends of the head and provides an especially ample, wide, open space for chips and coolant to pass rearwardly along the flute and out of the workpiece.

The drill depicted in FIG. 8 is, except for the tool base seat and the tool base, of the same configuration as the drill illustrated in FIGS. 1 through 4. Accordingly, it is to be understood that an elevation forward end view of the drill of FIG. 8 is depicted by FIG. 3 and that an elevation side view thereof is depicted by FIG. 2 except for the longitudinal locations of the tool base bolts and the base wall of the seat.

In FIG. 8, cutting tool base 57 is held in a V-groove seat which is disposed close to the junction of the leading and trailing faces of the flute and has curved base wall 58, inner side wall 59 and outer side wall 60. The V-angle of the seat illustrated in FIG. 8 is about 30°, the inner side wall is inclined at about 90° (longitudinally aligned) and the outer side wall is inclined at about 60°. The angles of rearward inclination of the inner and outer side walls are illustrated in FIG. 8 as angles $I_1$ and $I_2$. Tool base 57 has base seating surface 61 and side seating surfaces 62 and 63 which respectively mate with the base wall and the side walls of the seat. Tool base bolts 64 are seated in the tool base and fit in threaded holes in the head. When drills such as illustrated by FIG. 8 are in use, the tool base bolts and the seat walls coact to fix the cutting tool to the drill head with essential rigidity even in the presence of very high machining forces. Especially high rigidity of the cutting tool in center cut drills in accordance with the invention is obtained with embodiments wherein the seat has a longitudinally aligned inner side wall disposed close to the junction of the leading and trailing faces of the flute and has an outer side wall inclined at a high angle of inclination of about 60° to 65° since such embodiments have advantageously long side walls and long bearing surfaces for the tool base which result in especially good distribution of force and low surface pressures at the walls of the seat. The long side walls obtained with such a seat are very highly effective in preventing radial rotational movement of the cutting tool and other deleterious movement of the cutting tool in relation to the head. Another advantage obtained by having the seat close to the drill axis, particularly in relatively small diameter drills, is that with the seat so disposed, the retaining fasteners for the tool base can be fixed in the head near the drill axis where a relatively large amount of metal is available for strongly anchoring the fasteners. In addition, drills with seats and inserts such as illustrated by FIG. 8 have economic advantages from the viewpoint of requiring less set up work for machining than is required where the seat does not have a longitudinally aligned side wall.

Satisfactory cutter tips and wear pads of gun drills are made of materials characterized by extreme, high hardness, e.g., tungsten carbide or hardened tool steel. Advantageously, the cutter tips of gun drills in accordance with the invention are preformed tungsten carbide elements which are not ground for sharpening, thereby obtaining for gun drills special new advantages of improved cutting tool life without need for removing the tool from production for sharpening. It has been found that preformed (pressed and sintered to shape) tungsten carbide cutter tips, which have working surfaces and edges in the originally preformed condition, have greater resistance to abrasion and other wear than is obtained with tungsten carbide surfaces and edges which have been ground or otherwise cut to shape, possibly due to beneficial presence of oxides at the preformed surfaces. Regardless of whatever the theoretical explanation may be, substantially greater retention of sharpness is obtained with preformed tungsten carbide cutters than with resharpened cutters and worthwhile advantages, including less frequent interruption of production, are obtained with preformed cutter tips which, when eventually dulled, are replaced with new preformed cutter tips, as provided by the present invention, instead of being resharpened.

For the metal of the drill head, high toughness is especially required and it is also a practical necessity that the metal be readily machinable. While it is, in addition, highly desirable that the drill head have high compression strength, tensile strength and hardness, particularly in portions near the cutting tool and wear pads, the need for toughness and machinability is so great that especially tough metals having at least moderately high strength, e.g., SAE 4340 steel, characterized by a hardness of about 35 to 39 Rockwell C ($R_c$), rather than especially hard metals are used for gun drill heads. However, it must be recognized that even when gun drills are of good design and material and are used carefully, inadvertent overloading, excessive forcing, etc., occasionally cause damaging distortion and sometimes fracture of part of the drill. Drill damage is particularly a problem in gun drilling tough, heat-resistant and/or work-hardenable alloys. Such accidents are especially expensive when the drill head, rather than some less expensive part of the drill, is the part which fails. The present invention provides specially advantageous features for protecting the drill head including a special fail-safe cutting tool base which is characterized by lower strength, particularly lower compressive strength as evidenced by lower hardness, than the strength of the drill head and which, accordingly, is specially adapted to deform more readily than the head. Thus, in accordance with the invention it is advantageous for the tool base to have limited strength that provides for failure of the tool base at a load level slightly lower than the load lever which will cause distortion or other material failure of the head. For example, a cutting tool base of SAE 1095 steel in a condition characterized by a hardness of about 28 $R_c$ to about 33 $R_c$, e.g., 32 $R_c$ has sufficient toughness and strength for difficult drilling operations and also has satisfactory limited strength which is a small amount less than the compressive strength possessed by an alloy steel drill head characterized by Rockwell C hardness of 35 to 39. It has been found that when, in making a tool base insert in accordance with the invention, a cutting tool base of SAE 1095 steel which has previously been quench hardened is induction brazed at about 1050° F. to join a tungsten carbide tip thereto and is thereafter air cooled, the resulting hardness of the tool base is about 32 $R_c$. Air-cooled high carbon steel is also an advantageous material for wear pad bases for the new drill. An advantageous embodiment of the invention is a gun drill comprising a tough metal head of moderate hardness, e.g., about 35 to about 39 Rockwell C hardness, a cutting tool base and wear pad bases of metal characterized by hardness a small amount less, e.g., 2 to 11 Rockwell C units less, than the hardness of the head and by greater toughness and/or shock resistance than that of tungsten carbide and having a cutting tip and wear pads of tungsten carbide. For example, advantageously, a gun drill of the invention has a drill head of SAE 4340 steel, a cutting tool base and pad bases of SAE 1095 steel and a preformed, tungsten carbide cutter tip and wear pads. Of course, it is understood that steels referred to herein are usually heat treated to obtain desired characteristics by methods known to those skilled in the metallurgical art.

The gun drill of the invention is used by moving either the drill or the workpiece, or both, so as to have relative longitudinal and rotational movements between the drill and workpiece. The rearward portion of the drill head is adapted to be rigidly attached to means for driving (and/or holding) and in relation to the workpiece, the drill moves longitudinally forward and rotates with the cutter tip face leading, e.g., when viewed as in FIG. 3 the drill rotates counterclockwise. A very satisfactory method for drilling a longitudinally oriented hole in a cylindrical workpiece is to rotate the workpiece in the chuck of a lathe while feeding the drill through the workpiece with the drill drive bar mounted in the tailstock of the lathe. Other satisfactory methods include drilling with the drill held in the chuck of a drill press, boring mill, milling machine or other machine which provides rotation and feeding of the drill into the workpiece or vice versa. When using the gun drill of the invention it is not necessary to provide a starting hole in the workpiece since the gun drill cuts its own starting hole.

For the purpose of giving those skilled in the art a better understanding of the invention and a better appreciation of the advantages of the invention, the following illustrative examples are given:

A center-cut gun drill of the present invention, having a nominal diameter of 2 inches and a single large flute including a large central angle of at least about 90°, was used very successfully to drill blind holes about 58 inches deep in a tough, work-hardenable, heat-resistant nickel-chromium-iron alloy (nominal composition 77% nickel, 16% chromium, 7% iron) workpiece. The drive bar, with the drill attached thereto, was held rigidly in a tailstock mount on a lathe and the workpiece, which was a solid cylindrical bar of about 7⅝ inches nominal diameter, was rotated in the chuck of the lathe at a rotational speed of about 321 revolutions per minute. The drill, which was not rotated, was fed into the workpiece with a forward longitudinal feed of about 0.587 inch per minute. A total depth of about 116 inches of 2 inches diameter hole was drilled before the preformed tungsten carbide cutter tip was worn to the extent that resharpening would have been required if the tip was fusion bonded to the head. The replaceable cutting tool insert of the used drill was discarded and was replaced with a new cutting tool insert in accordance with the invention and drilling was resumed. It is noted that the aforesaid replacement took only about 18 minutes whereas about four hours would have been required for resharpening the cutter tip on a fusion bonded head. Use of the cutting head was resumed with continued satisfactory performance of the drill. Use of the drill head was continued throughout the useful lives of at least 23 replacement cutting tool inserts and, after being thus used for drilling a total of about 2,610 inches or more depth of hole, the drill head was still in good condition for additional satisfactory use. The wear pads on the drill were very satisfactory inasmuch as the rate of wear thereof was extremely low and the area of surface contact with the inside diameter of the alloy hole was great enough to prevent any rapid deterioration due to compressive forces resultant from the tool cutting forces. Only two sets of wear pads (4 pads) were used in drilling a total of 2,610 inches of holes. The accuracy and surface finish obtained with the drill were highly satisfactory, the drilled holes having a diameter of 1.996 inches plus or minus .001 inch with a surface smoothness of about 22 to 40 microinches as determined by root-mean-square measurement.

For drilling 2⅛ inch diameter holes, the cutting tool insert and wear inserts in the head of the aforementioned 2 inch diameter drill are replaced with oversize tool and wear inserts extending sufficiently from the side of the head to increase the nominal diameter of the drill to 2⅛ inches. In embodiments wherein the drill has cutting tool inserts extending substantially outward, e.g., up to 1/16 inch, of the side surface of the head, thereby providing the drill with means for drilling holes throughout a range of diameters, the cutting tool support extends radially outward to the side surface of the cutter tip so as to support the cutter tip fully along its entire radial extension.

The invention also provides target-type gun drills having replaceable cutting tool and wear pad inserts in accordance with the invention. For example, in a 2 inch diameter target-type drill made in accordance with the invention the cutter tip extended about ⅞ inch radially inward from the outer side surface of the drill and the head had a small centrally located passage of about 5/16 inch nominal diameter extending the length of the drill and opening out to the flute. Advantageously, especially for drilling nickel alloys, the inside face at the inside cutting edge of a target drill in accordance with the invention is at an included angle not greater than 90° to the cutting tip face in order to obtain good clearance and an adequate volume of lubricant between drill and core and to avoid galling.

In contrast to the prolonged useful life of the drill head of the invention, it was found by testing a commercially sold gun drill having a cutting tool which was fusion bonded to the drill head, which drill, of course, was not in accordance with the present invention, that the useful life of the fusion bonded drill head was fully expended after resharpening an average of about seven times and thereafter the drill could not be reconditioned for continued use. Moreover, after the first resharpening, the resharpened cutting tool exhibited inferior retention of sharpness as compared to preformed cutter tips. Generally, the retention of satisfactory sharpness is an average of about 15% less with resharpened cutters than with preformed replacement cutter tips in accordance with the invention.

The present invention enables gun drilling on a commercially economical basis at much faster drilling rates, e.g., 40% faster, than have been commercially practical with tooling in the prior art. Inasmuch as tool wear is generally accelerated when drilling rates are increased, costs of maintaining and/or replacing drills are important factors influencing the maximum drilling rate that can be accomplished satisfactorily on a commercially practical basis. When using gun drills in accordance with the invention, in which cutter tips and wear pads are replaced at very low cost, gun drilling can be economically accomplished at increased high speeds that otherwise would result in excessively high costs for maintenance and/or replacement of drills if fusion bonded drills in the prior art were used at such increased high speeds.

The new drill of the present invention is particularly useful for accurately drilling deep holes of relatively small diameter in relation to depth, e.g., holes of three inches or less diameter and up to 120 inches deep, in tough, heat-resistant and/or work-hardenable metals such as nickel-base alloys, including nickel-chromium alloys, e.g., nickel-chromium-iron alloys, nickel-chromium-cobalt alloys and nickel-chromium-aluminum-titanium alloys, and is also generally useful for drilling stainless steel, nickel-copper alloys, annealed steels, aluminum, annealed tool steels and other ferrous and nonferrous metals. The new drill is capable of producing drilled holes characterized by a high quality of surface finish and dimensional accuracy and thus obviates need for reaming in order to meet commercial specifications requirements on surface finish and dimensional tolerances. Gun drills of the invention are particularly applicable for drilling under conditions where it is impractical to rotate the workpiece and, thus, where the drill must be rotated.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. A gun drill comprising:
   (a) an elongated drill head having a rearward end portion adapted to be attached to a driving means, a forward end portion remote from the rearward end, a flute extending longitudinally from the forward end to the rearward end of the head, an internal coolant passage communicating with the forward end and the rearward end of the head and a cutting tool base seat disposed in said forward end portion and having a base wall and a pair of internal radially opposed side walls each longitudinally inclined toward the other at least 45 degrees rearward of a drill radius so as to mutually define a forward facing included V-angle not less than about 25 degrees and not greater than about 90 degrees;
   (b) a cutting tool base having a rearward base portion mated with said seat and replaceably engaged in said seat;
   (c) mechanical fastener means holding said cutting tool base engaged in said seat and adapted to be fastened and released without damaging said drill head, said fastener means and said seat walls being adapted to coact to prevent radial and axial movement of the cutting tool base relative to the drill head;
   (d) a cutter tip bonded to the cutting tool base at a portion thereof remote from said rearward base portion, disposed directly adjacent the flute, extending forwardly from said base and having a cutting edge extending substantially radially of the drill head axis and facing the forward portion of the drill head; and
   (e) a longitudinally extending wear pad disposed at an outer side surface of the head and extending radially beyond the outer side surface of the head.

2. A gun drill head as set forth in claim 1 wherein each of the internal radially opposed side walls are longitudinally inclined toward the other at least 60 degrees rearward of a drill radius so as to mutually define a forward facing included V-angle not less than about 25 degrees and not greater than about 60 degrees.

3. A gun drill comprising:
   (a) an elongated drill head having a rearward end portion adapted to be attached to a driving means, a forward end portion remote from the rearward end, a flute extending longitudinally from the forward end to the rearward end of the head, an internal coolant passage communicating with the forward end and the rearward end of the head and a cutting tool base seat disposed in said forward end portion and having a base wall and a pair of internal radially opposed side walls inclined to mutually define a forward facing V-angle, said side walls being so disposed that the inner side wall of the seat is substantially longitudinally aligned with the drill axis, the angle of inclination of the outer side wall of the seat is about 45 degrees to about 65 degrees and the included V-angle is about 25 degrees to about 45 degrees;
   (b) a cutting tool base having a rearward base portion mated with said seat and replaceably engaged in said seat;
   (c) mechanical fastener means holding said cutting tool base engaged in said seat and adapted to be fastened and released without damaging said drill head, said fastener means and said seat walls being adapted to coact to prevent radial and axial movement of the cutting tool base relative to the drill head;
   (d) a cutter tip bonded to the cutting tool base at a portion thereof remote from said rearward base portion, disposed directly adjacent the flute, extending forwardly from said base and having a cutting edge extending substantially radially of the drill head axis and facing the forward portion of the drill head; and (e) a longitudinally extending wear pad disposed at an outer side surface of the head and extending radially beyond the outer side surface of the head.

4. A gun drill as set forth in claim 3 wherein said cutter tip is made of pressed and sintered tungsten carbide and has a cutting edge in the pressed and sintered condition.

5. In a gun drill having an elongated gun drill head with a rearward portion adapted to be attached to drill driving means and a forward portion remote from said rearward portion, the improvement comprising a cutting tool seat in said forward portion, said seat having a base wall and a pair of internal radially opposed side walls each longitudinally inclined toward the other at least 45 degrees rearward of a drill radius so as to mutually define a forward facing included V-angle not less than about 25 degrees and not greater than about 90 degrees, a replaceable cutting tool insert having a base member replaceably engaged in said seat and a cutter tip member extending forwardly from said base member, and mechanical fastener means holding said cutting tool insert replaceably engaged in said seat and adapted to be fastened and released without damaging said drill head, said fastener means and said seat being adapted to coact to prevent radial and axial movement of the cutting tool insert relative to the drill head.

6. A gun drill head capable of rigidly and replaceably holding a replaceable cutting tool insert comprising a rearward end adapted to be attached to a driving means, a forward end remote from the rearward end, a cutting tool base seat disposed in said forward end and having a base wall and a pair of internal radially opposed side walls each longitudinally inclined toward the other at least 45 degrees rearward of a drill radius so as to mutually define a forward facing included V-angle not less than about 25 degrees and not greater than about 90 degrees, a longitudinally extending flute communicating with the forward end and the rearward end of the head, and means for replaceably attaching to the head a mechanically replaceable fastener adapted to hold a replaceable cutting tool insert rigidly in said seat.

7. A gun drill head as set forth in claim 6 having a longitudinally aligned wear pad seat at an outer side surface of the head.

8. A gun drill head as set forth in claim 6 wherein each of the internal radially opposed side walls are longitudinally inclined toward the other at least 60 degrees rearward of a drill radius so as to mutually define a forward facing included V-angle not less than about 25 degrees and not greater than about 60 degrees.

9. A gun drill head capable of rigidly and replaceably holding a replaceable cutting tool insert comprising a rearward end adapted to be attached to a driving means, a forward end remote from the rearward end, a cutting tool base seat disposed in said forward end and having a base wall, a straight inner side wall aligned substantially longitudinally with the drill axis and a straight outer side wall inclined about 45 degrees to about 65 degrees rearward of a drill radius and with said side walls mutually defining a forward facing V-angle such that the V-angle included between said inner side wall and said outer side wall is about 25 degrees to about 45 degrees, an internal coolant passage communicating with the forward end and the rearward end of the head, a longitudinally extending flute communicating with the forward end and the rearward end of the head and means for replaceably attaching to the head a mechanically replaceable fastener adapted to hold a replaceable cutting tool insert rigidly in said seat.

10. A gun drill head as set forth in claim 9 wherein the substantially longitudinally aligned inner side wall is disposed close to the junction of the leading and trailing faces of the flute.

11. A gun drill head as set forth in claim 10 wherein the outer side wall is inclined at least 60 degrees rearward of a drill radius and the included V-angle is 25 degrees to 30 degrees.

12. A gun drill comprising:
(a) an elongated drill head having a rearward end portion adapted to be attached to a driving means, a forward end portion remote from the rearward end, a flute extending longitudinally from the forward end to the rearward end of the head, an internal coolant passage communicating with the forward end and the rearward end of the head and a cutting tool base seat disposed in said forward end portion and having a base wall and a pair of internal radially opposed side walls each longitudinally inclined toward the other at least 45 degrees rearward of a drill radius so as to mutually define a forward facing included V-angle not less than about 25 degrees and not greater than about 90 degrees;
(b) a cutting tool base having a rearward base portion mated with said seat and replaceably engaged in said seat, said tool base being a fail-safe cutting tool base composed of metal characterized by toughness greater than the toughness of tungsten carbide and by limited strength less than the strength of the head, whereby said base is adapted to deform at a load level a small amount lower than the lowest load level which can cause deformation of the head;
(c) mechanical fastener means holding said cutting tool base engaged in said seat and adapted to be fastened and released without damaging said drill head, said fastener means and said seat walls being adapted to coact to prevent radial and axial movement of the cutting tool base relative to the drill head;
(d) a cutter tip bonded to the cutting tool base at a portion thereof remote from said rearward base portion, disposed directly adjacent the flute, extending forwardly from said base and having a cutting edge extending substantially radially of the drill head axis and facing the forward portion of the drill head; and
(e) a longitudinally extending wear pad disposed at an outer side surface of the head and extending radially beyond the outer side surface of the head.

13. A gun drill as set forth in claim 12 wherein the fail-safe cutting tool base is characterized by a hardness of 2 to 11 Rockwell C units less than the hardness of the head.

14. A gun drill comprising:
(a) an elongated drill head of metal characterized by high strength and toughness, having a rearward end portion adapted to be attached to a driving means, a forward end portion remote from the rearward end, an internal coolant passage communicating with the forward end and the rearward end of the head and a cutting tool base seat disposed in said forward end portion and having a base wall and a pair of internal radially opposed side walls each longitudinally inclined toward the other at least 45 degrees rearward of a drill radius so as to mutually define a forward facing included V-angle not less than about 25 degrees and not greater than about 90 degrees;
(b) a fail-safe cutting tool base having a rearward base portion mated with said seat and replaceably engaged in said seat, said base being of metal characterized by toughness greater than the toughness of tungsten carbide and by limited hardness of 2 to 11 Rockwell C units less than the hardness of the head, whereby said base is adapted to deform at a load level a small amount lower than the lowest load level which can cause deformation of the head;
(c) a preformed tungsten carbide cutter tip bonded to the cutting tool base at a portion of the base forward from said rearward base portion and having a pair of preformed cutting edges of equal length extending substantially radially of the drill head axis and tapering forwardly to a point;

(d) replaceable mechanical fastener means holding said cutting tool base to the drill head at two fastening points disposed in an alignment substantially parallel to the longitudinal axis of the drill and passing through said cutter point, said fastener means and said seat walls being adapted to coact to prevent radial and axial movement of the cutting tool base relative to the drill head when gun drilling work hardenable nickel-chromium alloys;

(e) said head having a full-length flute with a face coextensive with the cutting tool base and a sideward opening extending from the forward end of the drill to the rearward end of the drill and providing an unobstructed chip passageway from the cutter tip to the rearward end of the drill; and (f) a longitudinally extending wear pad disposed at an outer side surface of the head and extending radially beyond the outer side surface of the head.

15. A gun drill comprising:

(a) an elongated drill head having a rearward end portion adapted to be attached to a driving means, a forward end portion remote from the rearward end, a flute extending longitudinally from the forward end to the rearward end of the head, an internal coolant passage communicating with the forward end and the rearward end of the head and a cutting tool base seat disposed in said forward end portion and having a base wall and a pair of internal radially opposed side walls each longitudinally inclined toward the other at least 45 degrees rearward of a drill radius so as to mutually define a forward facing included V-angle not less than about 25 degrees and not greater than about 90 degrees;

(b) a cutting tool base having a rearward base portion mated with said seat and replaceably engaged in said seat;

(c) a cutter tip bonded to the cutting tool base at a portion thereof remote from said rearward base portion, disposed directly adjacent the flute, extending forwardly from said base and having a pair of cutting edges of equal length extending substantially radially of the drill head axis and tapering forwardly to a point;

(d) replaceable mechanical fastener means rigidly holding said cutting tool base to the drill head at two fastener locations disposed on a line parallel to the drill axis and in longitudinal alignment with the cutter point, said fastener means being adapted to coact with said base wall and said side walls to aid in resisting radial, tangential and axial forces tending to move the tool base relatively to the drill head during drilling;

(e) a longitudinally extending wear pad disposed at an outer side surface of the head and also extending radially beyond the outer side surface of the head.

16. A gun drill as set forth in claim 15 wherein the cutter tool base is fastened to the drill head with two bolts and has one of the bolts passing through the tool base at one of said fastener locations and has the other bolt passing through the tool base at the other of said fastener locations.

17. A gun drill as set forth in claim 15 having at least two longitudinally extending wear pads disposed at outer side surfaces of the head and also extending radially beyond outer side surfaces of the head.

References Cited

UNITED STATES PATENTS

| 2,869,405 | 1/1959 | Wolfe | 77—69 |
| 2,950,523 | 8/1960 | Frommelt et al. | 29—95 |
| 2,950,524 | 8/1960 | Frommelt et al. | 29—95 |

FRANCIS S. HUSAR, *Primary Examiner.*

U.S. Cl. X.R.

29—95